(12) United States Patent
Van Thillo et al.

(10) Patent No.: US 8,189,709 B2
(45) Date of Patent: May 29, 2012

(54) FREQUENCY DOMAIN EQUALIZATION METHOD FOR CONTINUOUS PHASE MODULATED SIGNALS

(75) Inventors: Wim Van Thillo, Deurne (BE); Andre Bourdoux, Esneux (BE)

(73) Assignees: IMEC, Leuven (BE); Katholieke Universiteit Leuven, Leuven (BE)

( * ) Notice: Subject to any disclaimer, the term of this patent is extended or adjusted under 35 U.S.C. 154(b) by 208 days.

(21) Appl. No.: 12/780,629

(22) Filed: May 14, 2010

(65) Prior Publication Data

US 2010/0316107 A1    Dec. 16, 2010

Related U.S. Application Data

(63) Continuation of application No. PCT/EP2008/066042, filed on Nov. 21, 2008.

(60) Provisional application No. 60/989,763, filed on Nov. 21, 2007.

(51) Int. Cl.
*H04L 27/10* (2006.01)

(52) U.S. Cl. ........................................................ 375/274

(58) Field of Classification Search ................ 375/322, 375/324, 325, 329, 271, 274, 279
See application file for complete search history.

(56) References Cited

U.S. PATENT DOCUMENTS

| 5,014,283 A * | 5/1991 | Baier ........................... 375/235 |
| 2005/0207474 A1 | 9/2005 | Voglewede |
| 2010/0034318 A1* | 2/2010 | Lui et al. ...................... 375/324 |

FOREIGN PATENT DOCUMENTS

| WO | WO 2007/068994 A | 6/2007 |
| WO | WO 2007/119215 A | 10/2007 |

OTHER PUBLICATIONS

Bourdoux, et al., Air Interface and Physical Layer Techniques for 60 GHz WPANs; IEEE Symposium on Communications and Vehicular Technology, Nov. 1, 2006, pp. 1-6.
Falconer et al., A. Benyamin-Seeyar, and B. Eidson, "Frequency domain equalization for single-carrier broadband wireless systems," IEEE Commun. Mag., Apr. 2002.
International Search Report and Written Opinion date Jun. 5, 2009 for PCT/EP2008/066010.
International Search Report and Written Opinion dated Jun. 5, 2009 for PCT/EP2008/066042.
Kaleh et al., Simple coherent receivers for partial response continuous phase modulation, IEEE Journal on Selected Areas in Communications, Dec. 1989, vol. 7, No. 9, pp. 1427-1436.

(Continued)

*Primary Examiner* — Kevin Kim
(74) *Attorney, Agent, or Firm* — Knobbe Martens Olson & Bear LLP

(57) ABSTRACT

A method for frequency domain equalization of a cyclic CPM signal received via a channel is disclosed. In one aspect, the method includes representing the received cyclic CPM signal as a matrix model comprising a channel matrix representing influence of the channel, separate from a Laurent pulse matrix and a pseudocoefficient matrix respectively representing Laurent pulses and pseudocoefficients determined by Laurent decomposition of the received cyclic CPM signal. The method may further include applying a channel equalizer on the separate channel matrix and after the equalization. It may further include demodulating the received cyclic CPM signal by the matrix model, the demodulation exploiting known correlation properties of the Laurent pulses and the pseudocoefficients.

19 Claims, 6 Drawing Sheets

OTHER PUBLICATIONS

Klein et al., "Zero Forcing and Minimum Mean-Square-Error equalization for multiuser detection in code-division multiple-access channels," *IEEE Trans. Veh. Technol.*, vol. 45, No. 2, pp. 276-287, May 1996.

Laurent et al., Exact and approximate construction of digital phase modulations by superposition of amplitude modulated pulses (AMP), IEEE Transactions on Communications, Feb. 1986, vol. 34, No. 2, pp. 150-160.

Murota et al., GMSK modulation for digital mobile radio telephony, IEEE Transactions on Communications, Jul. 1981, vol. 29, No. 7, pp. 1044-1050.

Pancaldi et al., Equalization algorithms in the frequency domain for continuous phase modulations, IEEE Transactions on Communications, Apr. 2006, vol. 54, No. 4, pp. 648-658.

Pancaldi, et al., Equalization algorithms in the frequency domain for continuous phase modulations, IEEE Global Telecommunications Conference, Nov. 28, 2005; vol. 3., pp. 1614-1619; NJ, USA.

Park et al., Analysis of 60 GHz band indoor wireless channels with channel configurations, Proceedings of IEEE PIMRC, Sep. 1998, pp. 617-620.

Rimoldi, "A decomposition Approach to CPM," IEEE Trans. Inf. Theory, vol. 34, No. 2, pp. 260.270, Mar. 1988.

Saleh et al., A statistical model for indoor multipath propagation, IEEE Journal on Selected Areas in Communications, Feb. 1987, vol. SAC-5, No. 2, pp. 128-137.

Sundberg, "Continuous phase modulation," *IEEE Commun. Mag.*, vol. 24, No. 4, pp. 25.38, Apr. 1986.

Tan et al., Frequency-domain equalization for continuous phase modulation, IEEE International Symposium on Personal, Indoor, and Mobile Radio Communications, Sep. 2004, vol. 3, pp. 2267-2272.

Van Thillo et al., Low-Complexity Frequency Domain Equalization Received for Continuous Phase Modulation; IEEE Global Telecommunications Conference; Nov. 1, 2007; pp. 3374-3378; NJ, USA.

Wang et al., Wireless multicarrier communications, IEEE Signal Processing Magazine, May 2000, vol. 17, No. 7, pp. 29-48.

Zhao et al., "Reduced complexity receivers for layered space-time CPM," *IEEE Trans. Wireless Commun.*, vol. 4, No. 2, pp. 574.582, Mar. 2005.

* cited by examiner

FREQUENCY DOMAIN EQUALIZATION METHOD FOR CONTINUOUS PHASE MODULATED SIGNALS

CROSS REFERENCE TO RELATED APPLICATIONS

This application is a continuation of PCT Application No. PCT/EP2008/066042, filed Nov. 21, 2008, which claims priority under 35 U.S.C. §119(e) to U.S. provisional patent application 60/989,763 filed on Nov. 21, 2007. Each of the above applications is incorporated herein by reference in its entirety.

BACKGROUND OF THE INVENTION

1. Field of the Invention

The present invention relates to a method for frequency domain equalization (FDE) of a cyclic continuous phase modulated (CPM) signal received via a channel.

2. Description of the Related Technology

There is an explosive growth in the demand for wireless connectivity. Short ranges wireless links will soon be expected to deliver bit rates of over 2 Gbit/s. Worldwide, recent regulation assigned an at least 3 GHz-wide frequency band at 60 GHz to this kind of applications. Chips for mobile consumer devices need to be power efficient; hence a suitable modulation technique for 60 GHz transceivers should allow an efficient operation of the power amplifier (PA). Moreover, these chips need to be cheap so the modulation technique should have a high level of immunity to front end nonidealities.

Continuous phase modulated (CPM) signals posses these properties. In contrast to other coherent digital phase modulation techniques where the carrier phase abruptly resets to zero at the start of every symbol (e.g. M-ary phase-shift keying (M-PSK)), with CPM the carrier phase is modulated in a continuous manner. Furthermore, they have a perfectly constant envelope which makes them much more favorable than orthogonal frequency-division multiplexing (OFDM), as cheap, power efficient nonlinear PA's can be used instead or expensive, inefficient linear ones. They are also more robust against other front end imperfections such as phase noise and analog-to-digital converter clipping and quantization. Moreover, they combine attractive spectral properties with excellent power efficiency. The primary drawback is the high implementation complexity required for an optimal receiver.

SUMMARY OF CERTAIN INVENTIVE ASPECTS

Certain inventive aspects relate to a method for frequency domain equalization of a received cyclic CPM signal with which complexity of a receiver in which the method is implemented can be reduced.

One inventive aspect relates to a method comprising representing the received cyclic CPM signal as a matrix model comprising a channel matrix representing influence of the channel, separate from a Laurent pulse matrix and a pseudocoefficient matrix respectively representing Laurent pulses and pseudocoefficients determined by Laurent decomposition of the received cyclic CPM signal. The method may further comprise applying a channel equalizer on the separate channel matrix and after the equalization, demodulating the received cyclic CPM signal by means of the matrix model, the demodulation exploiting known correlation properties of the Laurent pulses and the pseudocoefficients.

One inventive aspect relates to a high-performance, low-complexity approach to FDE of cyclic CPM signals. A matrix model is developed, valid for any cyclic CPM signal. The main difference with respect to the prior art is that the Laurent representation is used while channel equalization and CPM demodulation are separated, i.e. preferably only the channel matrix is equalized and not the Laurent pulse matrix. This separation makes it possible to exploit the correlation properties of the CPM signal in the demodulator, after the channel equalizer, as a result of which complexity of the receiver can be reduced.

In certain embodiments, the channel equalizer is a zero-forcing equalizer, which can further reduce the complexity of the receiver.

In certain embodiments, the channel equalizer is a minimum mean square error (MMSE) equalizer comprising an autocorrelation matrix of the CPM signal to be inverted, the method further comprising the step of approximating the autocorrelation matrix by a corresponding block diagonal matrix. It has been found that calculating the MMSE equalizer requires the inversion of a nondiagonal matrix. This defeats the primary objective of FDE, namely low-complexity equalization requiring only inversion of diagonal matrices in the frequency domain. Therefore, in order to restore the original advantage of FDE, the CPM autocorrelation matrix is approximated by a block-diagonal matrix, which can surprisingly be done without severely affecting the bit error rate (BER).

In certain embodiments, the matrix model is a polyphase matrix model comprising equivalent time domain and frequency domain matrix models. The advantage is that the two equivalent time domain and frequency domain models make it possible to perform all signal processing tasks where they can be done most efficiently, either in the time domain or in the frequency domain. For example, the demodulation comprises applying a matched filterbank matched to the Laurent pulses in the frequency domain and a Viterbi decoder in the time domain.

The cyclicity of the CPM signal is preferably achieved by means of state compensation data for removing memory of the CPM signal. This state compensation data is preferably introduced in the data block by means of a subblock of fixed length, which is herein referred to as an "intrafix". The cyclicity of the CPM signal can however also be achieved in any other way known to the person skilled in the art, such as for example adding the antipode of the data to the data block.

Another inventive aspect relates to a system implementing the method above. The system may comprise a processor configured to execute instructions and perform the method above. The method may be a general purpose, or a special purpose processor, and may be for inclusion in a device, e.g. a chip that has other components that perform other functions. Thus, one or more aspects of the present invention can be implemented in digital electronic circuitry, or in computer hardware, firmware, software, or in combinations of them. Furthermore, aspects of the invention can be implemented in a computer program product tangibly embodied in a transitory or non-transitory computer-readable medium carrying machine-readable code for execution by a programmable processor. Method steps in the foregoing embodiments may be performed by a programmable processor executing instructions to perform functions of those aspects of the invention, e.g. by operating on input data and generating output data.

Another inventive aspect relates to a device for performing frequency domain equalization of a cyclic continuous phase modulated (CPM) signal received via a channel. The device comprises a representing module configured to represent the received cyclic CPM signal as a matrix model comprising a channel matrix representing influence of the channel, the channel matrix being separate from a Laurent pulse matrix and a pseudocoefficient matrix, the Laurent pulse matrix representing Laurent pulses, the pseudocoefficient matrix representing pseudocoefficients determined by Laurent decomposition of the received cyclic CPM signal. The device may further comprise a channel equalizer configured to perform channel equalization on the separate channel matrix. The device may further comprise a demodulator configured to demodulate the received cyclic CPM signal by the matrix model, the demodulation exploiting known correlation properties of the Laurent pulses and the pseudocoefficients.

BRIEF DESCRIPTION OF THE DRAWINGS

The invention will be further elucidated by means of the following description and the appended drawings.

DETAILED DESCRIPTION OF CERTAIN ILLUSTRATIVE EMBODIMENTS

Figure 1:
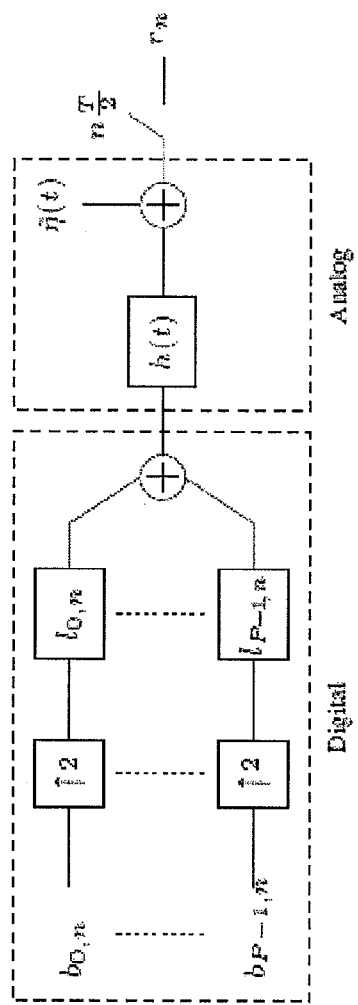
FIG. 1 shows a communication system model in which certain embodiments of the invention can be applied.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

CPM is a nonlinear modulation technique so it is mathematically less tractable. Fortunately, Laurent (P. A. Laurent, "Exact and approximate construction of digital phase modulations by superposition of amplitude modulated pulses (AMP)", IEEE Trans. Commun., vol. 34, no. 2, pp. 150-160, February 1986, which is incorporated herein by reference) showed that any binary CPM signal (except those with an integer modulation index) can be decomposed in a sum of linearly modulated signals. In this decomposition, the data symbols are nonlinearly mapped on a set of pseudocoefficients (PCs), which then pass through a bank of linear pulse shaping filters called Laurent pulses (LPs). The Laurent pulses introduce correlation over several symbol intervals.

An optimal CPM receiver in additive white Gaussian noise (AWGN) based on the Laurent decomposition contains a Viterbi decoder. This decoder exploits the correlation properties of the LPs and PCs to perform maximum likelihood sequence detection (MLSD) of the sent symbols. Nevertheless, the typical 60 GHz channel is severely frequency-selective for the targeted bandwidth. Equalizing such channel in the frequency domain (FD) rather than in the time domain (TD) can significantly lower the computational complexity of the system.

By equalizer, the device is meant which attempts to cancel Inter Symbol Interference (ISI), introduced either by the channel as well as by the Laurent pulses or only by the channel. The device estimating the sent data symbols from the output of the equalizer is called demodulator. The output of the equalizer is fed to a modulator which can exploit the Laurent pulses to perform maximum likelihood sequence detection (MLSD). The whole of equalizer and demodulator together is called receiver.

In the method described below, the problem of equalization is split up; on the one hand there is channel equalization and on the other, demodulation of the equalized CPM signal. A linear equalizer is first applied to filter out the intersymbol interference (ISI) introduced by the channel. The output of this equalizer is then fed to a CPM demodulator, which can still exploit the correlation properties of the LPs and of the PCs to perform MLSD. This approach has two main advantages.

When combining the process of separation (channel equalization and CPM demodulation) with the Laurent decomposition technique, the nonlinear nature of CPM is completely captured in the mapping of the input symbols on the PCs. This allows us to construct a TD polyphase matrix model, valid for any block-based CPM system. This allows us to derive our new equalizers using the framework for block-based FDE. In this framework, a matrix model is first established in the TD and then transformed into the FD. The two equivalent TD and FD models allow us to perform all signal processing tasks where they can be done most efficiently, either in the TD or in the FD. Furthermore, the autocorrelation properties of the PCs are known. This enables us to significantly reduce the complexity of our MMSE equalizer. The elements beyond the main block diagonal of the CPM autocorrelation matrix can be neglected. The calculation of the resulting reduced-complexity MMSE equalizer then only requires the inversion of a block-diagonal matrix. This lowers the computational requirements significantly, without any noticeable performance loss. Moreover, it can be applied to any CPM scheme, independently of the modulation index.

Vectors in the TD are represented by underlined lowercase letters x, in the FD by uppercase letters X. The nth element of a vector x is xn. Matrices are doubly underlined X. In a matrix or vector, [x, y, x] are elements on a row, while [x; y; z] form a column. The hermitian transpose of a matrix is denoted by (.)H and (.)* denotes the complex conjugate. We do not use the classical boldface lowercase notation for vectors and uppercase for matrices as it does not allow us to distinguish between vectors and matrices both in TD and FD. The (n,m)th element of a matrix x is $\lfloor x \rfloor_{(n,m)}$. In a matrix or vector, [x, y, z] are elements on a row, whereas [x; y; z] form a column. An identity matrix of size N is denoted by $1_N$, an N×M matrix containing all zeros by $0_{N \times M}$, and an N×M matrix containing all ones by $J_{N \times M}$. The Kronecker product is denoted by ⊗ and ⊙ denotes the Hadamard matrix product. A convolution is denoted by *.

A transmitted CPM signal has the form:

$$s(t, \underline{a}) = \sqrt{\frac{2E_s}{T}} e^{j\psi(t,\underline{a})} \quad (1)$$

Where α contains the sequence of M-ary data symbols $a_n = \pm 1, \pm 3, \ldots, \pm(M-1)$. The symbol duration is T and $E_S$ is the energy per symbol, normalized to $E_S = 1$. The transmitted information is contained in the phase:

$$\psi(t, \underline{a}) = 2\pi h \sum_n a_n \cdot q(t - nT) \quad (2)$$

Where h is the modulation index and q(t) is the phase response, related to the frequency response $f(t)$ by the relationship $q(t) = \int_{-\infty}^{t} f(\tau) d\tau$. The pulse $f(t)$ is a smooth pulse shape over a finite time interval $0 \leq t \leq LT$ and zero outside. The function $f(t)$ is normalized such that $$\int_{-\infty}^{\infty} f(t) dt = \frac{1}{2}.$$

It can be seen that the phase $\psi(t,a)$ during interval $nT \leq t \leq (n+1)T$ can then also be written as:

$$\psi(t, \underline{a}) = h\pi \sum_{i=0}^{n-L} a_i + 2\pi h \sum_{i=n-L+1}^{n} a_i \cdot q(t - iT) \quad (3)$$

We distinguish two types of memory in the CPM signal: the phase state $$\theta_n = h\pi \sum_{i=0}^{n-L} a_i \mod 2\pi,$$

and the correlative state $\sigma_n = (a_{n-1}, a_{n-2}, \ldots, a_{n-L+1})$. Together, they form the state of the CPM signal $\chi_n = (\theta_n, \sigma_n)$ which captures all the memory. This memory is taken into account to make the CPM signal cyclic, which enables FDE.

Figure 2:
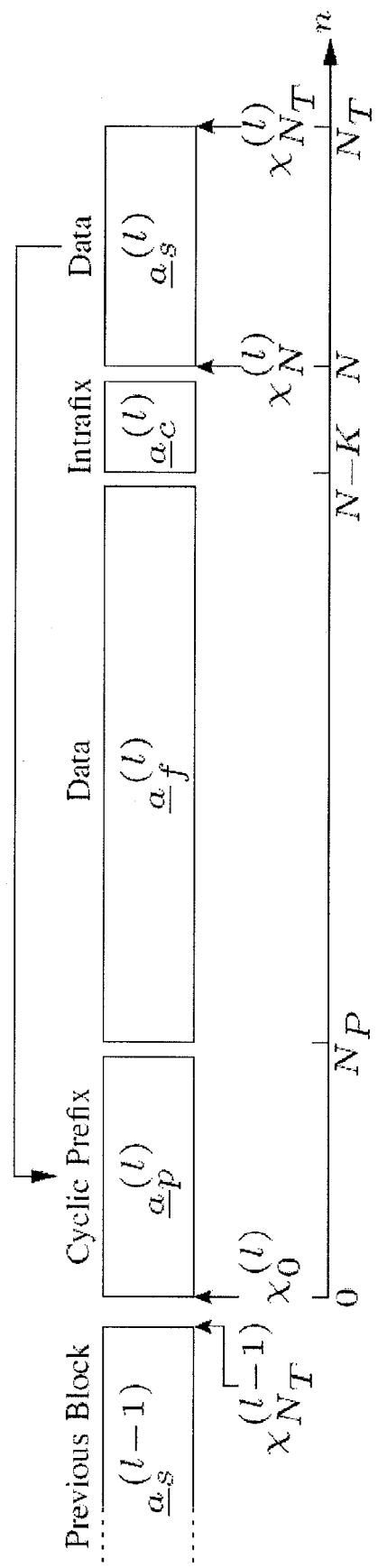
FIG. 2 shows schematically a structure of an overall data block usable with embodiments of the invention.

A block-based communication system is considered, where a cyclic prefix (CP) is attached to each transmitted block $\underline{a}^{(l)}$ to enable low-complexity equalization in the FD. The construction of a data block which yields a cyclic CPM signal is not trivial as the signal contains memory. This memory is reflected by the state $\chi_n^{(l)}$ of the modulator at symbol interval n in block l, see FIG. 2. The transmitter thus has to be forced into a known state at a certain point, to ensure cyclicity of the CPM signal after insertion of the CP. This can be done by inserting a subblock $\underline{a}_c^{(l)}$ of K data-dependent symbols, which can be calculated such that $\chi_N^{(l)} = \chi_{N_T}^{(l-1)}$. As shown in FIG. 2, the input symbol stream $\underline{a}$ is first cut in blocks $\lfloor \underline{a}_f^{(l)}; \underline{a}_s^{(l)} \rfloor$ of length N−K, where the superscript (l) refers to the $l^{th}$ block. Then an intrafix $\underline{a}_c^{(l)}$ of length K is inserted in each block, yielding blocks $[\underline{a}_f^{(l)}; \underline{a}_c^{(l)}; \underline{a}_s^{(l)}]$ of length N. Finally, the CP of length $N_P$ is inserted so that we obtain blocks of size $N_T = N + N_P$ $$\underline{a}^{(l)} = \lfloor \underline{a}_P^{(l)}; \underline{a}_f^{(l)}; \underline{a}_c^{(l)}; \underline{a}_s^{(l)} \rfloor \quad (4)$$

The CP length $N_P$ is chosen such that $N_P > L_C$ to avoid interblock interference (IBI).

The channel impulse response is assumed to be constant during the transmission of block l and can be written as $h^{(l)}(t)$. It is assumed that this is always perfectly known at the receiver and $h^{(l)}(t) = 0$ for $t < 0$ and $t > L_c T$. The length $N_P$ of the CP is chosen such that it is longer than the overall channel memory, i.e. $N_P \geq L_c + L$. The total block length is then $N_T = N + N_P$ where N is the size of the block containing the input symbols and the intrafix.

Exploiting the Laurent decomposition [1], (1) can be written as a sum of $P = 2^{L-1}$ linearly modulated signals:

$$s(t) = \sum_{p=0}^{P-1} \sum_n b_{p,n} l_p(t - nT) \quad (5)$$

Where the pseudocoefficients $b_{p,n}$ are given by:

$$b_{p,n} = \exp\left[j\pi h\left(\sum_{i=1}^{n} a_i - \sum_{i=1}^{L-1} a_{n-i} \beta_{p,i}\right)\right] \quad (6)$$

with $\beta_{p,i}$ the $i^{th}$ bit in the binary representation of $$p\left(p = \sum_{i=1}^{L-1} 2^{i-1} \beta_{p-i}\right).$$

The LPs $l_p(t)$, $p = 0, \ldots, P-1$ are real, with nonzero values in the interval $L_P T$, $l_p(t)$, $p = 0, \ldots, P-1$ respectively, where $L_p \leq L+1$. Representation (5) is only valid for binary modulation formats (M=2) and noninteger h. For simplicity, these cases will be considered, but the techniques can be generalized to all CPM formats. Further, we assume that the frequency components of the CPM signal above 1/T are negligible. This allows us to construct a discrete version of (5):

$$s_n = \sum_{p=0}^{P-1} \sum_n b_{p,m} l_{p,n-2m} \qquad (7)$$

Where $l_{p,n} \doteq l_p(t)|_{t=nT/2}$ and $s_n \doteq s(t)|_{t=nT/2}$. If the assumption made above is not satisfied for a particular CPM scheme, a higher oversampling rate can be chosen. The proposed model can be adapted accordingly and stays valid.

The receiver is constructed based on the digital representation of the sent signal. It is shown in the left part of FIG. 1. The transmitted signal (7) is digital-to-analog converted and filtered by the transmitter filter $\psi_{tr}(t)$. It is then sent through a linear multipath channel $\psi_h(t)$ and through the receive filter $\psi_{rec}(t)$. Let $h(t)=\psi_{tr}(t)*\psi_h(t)*\psi_{rec}(t)$ denote the overall impulse response of the cascade transmit filter, linear channel and receive filter with maximum length $L_C T$. The received baseband signal can then be written as $$r(t) = \sum_n s_n h(t - nT/2) + \tilde{\eta}(t) \qquad (8)$$

where with $\tilde{\eta}(t)=\eta(t)*\psi_{rec}(t)$ with $\eta(t)$ the Additive White Gaussian Noise (AWGN). The received signal is sampled at $f_s = 2/T$ and split into two polyphase components $i=0,1$ $$r_n^i \doteq r(t)|_{t=(2n+i)T/2} = \sum_m s_m^0 h_{n-m}^i + \sum_m s_m^1 h_{n-m-1+i}^{(1-i)} + \tilde{\eta}_n^i \qquad (9)$$

where $$h_n^i \doteq h(t)|_{t=(2n+i)T/2} \qquad (10)$$

$$\tilde{\eta}_n^i \doteq \tilde{\eta}(t)|_{t=(2n+i)T/2} \qquad (11)$$

$$s_n^i \doteq s_{2n+i} = \sum_{p=0}^{P-1} \sum_m b_{p,m} l_{p,n-m}^i \qquad (12)$$

$$l_{p,n}^i \doteq l_{p,2n+i} \qquad (13)$$

A similar approach as in [2] is applied to formulate the system (9)-(13) in matrix form. We define blocks of PCs $$b_p^{(l)} \doteq [b_{p,lN} \, b_{p,lN+1} \ldots b_{p,(l+1)N-1}]^T \qquad (14)$$

for $p=0, \ldots, P-1$. As stated above, the blocks (14) do not contain the CP yet, but they do already contain an intrafix. We define $$\underline{T}_{CP} = [\underline{0}_{N_P \times (N-N_P)}, \underline{1}_{N_P}; \underline{1}_N] \qquad (15)$$

such that the CP insertion can be written as a left multiplication of the blocks $\underline{b}_p$ with $\underline{T}_{CP}$ as $$\acute{b}_p^{(l)} \doteq \underline{T}_{CP} \underline{b}_p^{(l)} \qquad (16)$$

We now stack all blocks of PCs into one large vector $$\underline{b}^{(l)} \doteq [\underline{b}_0^{(l)}; \underline{b}_1^{(l)}; \ldots; \underline{b}_{P-1}^{(l)}] \qquad (17)$$

so that we can write $$\acute{\underline{b}}^{(l)} \doteq [\acute{\underline{b}}_0^{(l)}; \acute{\underline{b}}_1^{(l)}; \ldots; \acute{\underline{b}}_{P-1}^{(l)}] = (\underline{I}_P \otimes \underline{T}_{CP}) \underline{b}^{(l)} \qquad (18)$$

To describe the LPs and the linear channel in matrix form, we proceed as in [3] and define $N_T \times N_T$ convolution matrices as $$[\underline{L}_{p,0}^i]_{(n,m)} \doteq l_{p,n-m}^i, \, i=0,1 \qquad (19)$$

$$[\underline{h}_0^{i(l)}]_{(n,m)} \doteq h_{n-m}^{i(l)}, \, i=0,1 \qquad (20)$$

$$[\underline{h}_0^{1'(l)}]_{(n,m)} \doteq h_{n-m-1}^{1(l)} \qquad (21)$$

$$[\underline{L}_{p,1}^i]_{(n,m)} \doteq l_{p,N_T+n-m}^i, \, i=0,1 \qquad (22)$$

$$[\underline{h}_1^{i(l)}]_{(n,m)} \doteq h_{N_T+n-m}^{i(l-1)}, \, i=0,1 \qquad (23)$$

$$[\underline{h}_1^{1'(l)}]_{(n,m)} \doteq h_{N_T+n-m-1}^{1(l-1)} \qquad (24)$$

Figure 3:
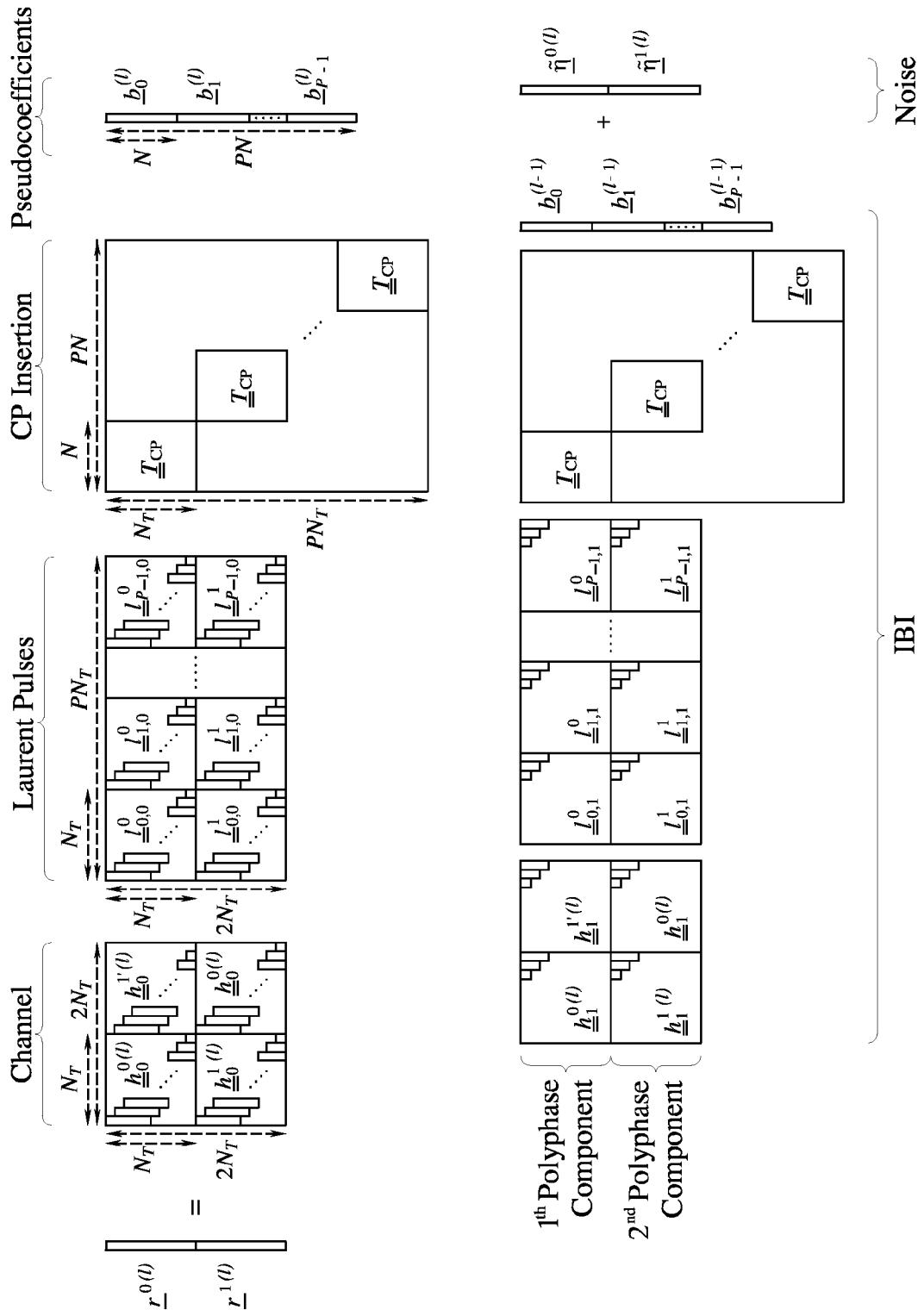
FIG. 3 shows a preferred embodiment of the matrix model of a received signal.

Here we assumed that the channel impulse response remains constant during the transmission of block $l$, and can therefore be written as $h_n^{(l)}$. Matrices (22)-(24) with subscript 1 will describe the IBI. Matrices (21) and (24) will be needed to represent the second term of (9) for $i=0$. The structure of these matrices is illustrated in FIG. 3 and will be further clarified.

Using (19)-(24) and (10)-(13), we can now write the first polyphase component $i=0$ of the received signal (9) in vector form $$\underline{r}^{0(l)} \doteq [r_{lN_T}^0 \, r_{lN_T+1}^0 \, \ldots \, r_{(l+1)N_T-1}^0]^T \qquad (25)$$

$$= \underline{h}_0^{0(l)} \left(\sum_{p=0}^{P-1} \underline{L}_{p,0}^0 \acute{b}_p^{(l)}\right) + \underline{h}_0^{1'(l)} \left(\sum_{p=0}^{P-1} \underline{L}_{p,0}^1 \acute{b}_p^{(l)}\right) +$$

$$\underline{h}_1^{0(l)} \left(\sum_{p=0}^{P-1} \underline{L}_{p,1}^0 \acute{b}_p^{(l-1)}\right) + \underline{h}_1^{1'(l)} \left(\sum_{p=0}^{P-1} \underline{L}_{p,1}^1 \acute{b}_p^{(l-1)}\right) + \tilde{\underline{\eta}}^{0(l)}$$

Whereas the second polyphase component $i=1$ can be written as $$\underline{r}^{1(l)} \doteq [r_{lN_T}^1 \, r_{lN_T+1}^1 \, \ldots \, r_{(l+1)N_T-1}^1]^T = \qquad (26)$$

$$\underline{h}_0^{1(l)} \left(\sum_{p=0}^{P-1} \underline{L}_{p,0}^0 \acute{b}_p^{(l)}\right) + \underline{h}_0^{0(l)} \left(\sum_{p=0}^{P-1} \underline{L}_{p,0}^1 \acute{b}_p^{(l)}\right) +$$

$$\underline{h}_1^{1(l)} \left(\sum_{p=0}^{P-1} \underline{L}_{p,1}^0 \acute{b}_p^{(l-1)}\right) + \underline{h}_1^{0(l)} \left(\sum_{p=0}^{P-1} \underline{L}_{p,1}^1 \acute{b}_p^{(l-1)}\right) + \tilde{\underline{\eta}}^{1(l)}$$

where $$\tilde{\underline{\eta}}^{i(l)} = [\tilde{\eta}_{lN_T}^i \, \tilde{\eta}_{lN_T+1}^i \, \ldots \, \tilde{\eta}_{(l+1)N_T-1}^i]^T, \, i=0,1 \qquad (27)$$

Stacking these components (25) and (26) into one vector, and writing the sums over $p$ as a matrix multiplication using (18), we get $$\underline{r}^{(l)} \doteq \begin{bmatrix} \underline{r}^{0(l)} \\ \underline{r}^{1(l)} \end{bmatrix} \qquad (28)$$

$$= \begin{bmatrix} \underline{h}_0^{0(l)} & \underline{h}_0^{1'(l)} \\ \underline{h}_0^{1(l)} & \underline{h}_0^{0(l)} \end{bmatrix} \begin{bmatrix} \underline{l}_{0,0}^0 & \underline{l}_{1,0}^0 & \cdots & \underline{l}_{P-1,0}^0 \\ \underline{l}_{0,0}^1 & \underline{l}_{1,0}^1 & \cdots & \underline{l}_{P-1,0}^1 \end{bmatrix} (\underline{I}_P \otimes \underline{T}_{CP}) \underline{b}^{(l)}$$

$$\begin{bmatrix} \underline{h}_1^{0(l)} & \underline{h}_1^{1'(l)} \\ \underline{h}_1^{1(l)} & \underline{h}_1^{0(l)} \end{bmatrix} \begin{bmatrix} \underline{l}_{0,1}^0 & \underline{l}_{1,1}^0 & \cdots & \underline{l}_{P-1,1}^0 \\ \underline{l}_{0,1}^1 & \underline{l}_{1,1}^1 & \cdots & \underline{l}_{P-1,1}^1 \end{bmatrix} (\underline{I}_P \otimes \underline{T}_{CP}) \underline{b}^{(l-1)} +$$

$$\begin{bmatrix} \tilde{\underline{\eta}}^{0(l)} \\ \tilde{\underline{\eta}}^{1(l)} \end{bmatrix}.$$

This matrix model is visualized in FIG. 3. The useful information is contained in the first term, the IBI in the second one and the noise in the last one. The first term itself is a product of four factors: one matrix representing the channel convolution, a second one representing the LPs convolution, a third one representing the CP insertion and a final vector containing the P blocks of PCs.

The first operation in the receiver is the removal of the CP. This can be done by multiplying both polyphase components of the received signal (28) with the matrix $$\underline{R}_{CP} \doteq [\underline{0}_{N \times N_p}, \underline{I}_N] \quad (29)$$

It can be seen that the second term of (28) becomes zero, which means that the IBI has been eliminated. We can therefore drop the block dependence (1) and the subscript 0 of the remaining term for simplicity:

$$\underline{r} \doteq \begin{bmatrix} \underline{r}^0 \\ \underline{r}^1 \end{bmatrix} = (\underline{I}_2 \otimes \underline{R}_P)\tilde{r} \quad (30)$$

$$= \begin{bmatrix} \underline{R}_{CP}\underline{h}^0 & \underline{R}_{CP}\underline{h}^{1'} \\ \underline{R}_{CP}\underline{h}^1 & \underline{R}_{CP}\underline{h}^0 \end{bmatrix}$$

$$\begin{bmatrix} \underline{I}_0^0 \underline{T}_{CP} & \underline{I}_1^0 \underline{T}_{CP} & \cdots & \underline{I}_{P-1}^0 \underline{T}_{CP} \\ \underline{I}_0^1 \underline{T}_{CP} & \underline{I}_1^1 \underline{T}_{CP} & \cdots & \underline{I}_{P-1}^1 \underline{T}_{CP} \end{bmatrix} \underline{b} +$$

$$\begin{bmatrix} \tilde{\underline{\eta}}^0 \\ \tilde{\underline{\eta}}^1 \end{bmatrix}.$$

If we choose $N_p > L_C + L$, it can be seen that $$\underline{R}_{CP}\underline{h}^i \underline{I}_p^j \underline{T}_{CP} = \underline{R}_{CP}\underline{h}^i \underline{T}_{CP}\underline{R}_{CP}\underline{I}_p^j \underline{T}_{CP} \quad (31)$$

for any $i, j \in \{0,1\}$, such that (30) can be written as $$\underline{r} = \begin{bmatrix} \underline{R}_{CP}\underline{h}^0 \underline{T}_{CP} & \underline{R}_{CP}\underline{h}^{1'} \underline{T}_{CP} \\ \underline{R}_{CP}\underline{h}^1 \underline{T}_{CP} & \underline{R}_{CP}\underline{h}^0 \underline{T}_{CP} \end{bmatrix} \quad (32)$$

$$\begin{bmatrix} \underline{R}_{CP}\underline{I}_0^0 \underline{T}_{CP} & \underline{R}_{CP}\underline{I}_1^0 \underline{T}_{CP} & \cdots & \underline{R}_{CP}\underline{I}_{P-1}^0 \underline{T}_{CP} \\ \underline{R}_{CP}\underline{I}_1^1 \underline{T}_{CP} & \underline{R}_{CP}\underline{I}_1^1 \underline{T}_{CP} & \cdots & \underline{R}_{CP}\underline{I}_{P-1}^1 \underline{T}_{CP} \end{bmatrix} \underline{b} + \begin{bmatrix} \tilde{\underline{\eta}}^0 \\ \tilde{\underline{\eta}}^1 \end{bmatrix}$$

As explained in [3], left multiplication with $R_{CP}$ and right multiplication with $T_{CP}$ of an $N_T \times N_T$ convolution matrix x results in a circulant $N \times N$ matrix $\dot{\underline{x}}$ $$\dot{\underline{x}} \doteq \underline{R}_{CP}\underline{x}\underline{T}_{CP} \quad (33)$$

where the dot denotes the circulant property, such that $$[\dot{\underline{x}}]_{(n,m)} = [\underline{x}]_{((n-m+1) \bmod N, 1)} \quad (34)$$

Therefore, we can write (32) as $$\underline{r} = \begin{bmatrix} \dot{\underline{h}}^0 & \dot{\underline{h}}^{1'} \\ \dot{\underline{h}}^1 & \dot{\underline{h}}^0 \end{bmatrix} \begin{bmatrix} \dot{\underline{I}}_0^0 & \dot{\underline{I}}_1^0 & \cdots & \dot{\underline{I}}_{P-1}^0 \\ \dot{\underline{I}}_0^1 & \dot{\underline{I}}_1^1 & \cdots & \dot{\underline{I}}_{P-1}^1 \end{bmatrix} \underline{b} + \begin{bmatrix} \tilde{\underline{\eta}}^0 \\ \tilde{\underline{\eta}}^1 \end{bmatrix} \quad (35)$$

$$\doteq \dot{\underline{h}} \dot{\underline{l}} \underline{b} + \tilde{\underline{\eta}} \quad (36)$$

where all N×N submatrices $\dot{\underline{x}}$ of $\dot{\underline{l}}$ and $\dot{\underline{h}}$ appearing in (35) are circulant.

We now have a well-structured polyphase TD matrix model which describes the received samples of any block-based cyclic-prefixed CPM system. We will transform this model into the FD such that all circulant matrices become diagonalized. Any circulant N×N matrix $\dot{\underline{x}}$ can be transformed into a diagonal N×N matrix $\underline{X}$ as $$\underline{X} = \underline{F}_N \dot{\underline{x}} \underline{F}_N^H \quad (37)$$

where $\underline{F}_N$ is an N-size discrete Fourier transform (DFT) matrix. Moreover, $$\text{diag}(\underline{X}) = \underline{F}_N \underline{x} \quad (38)$$

where x is the first column of $\dot{\underline{x}}$. To diagonalize all circulant submatrices of $\dot{\underline{h}}$ and $\dot{\underline{l}}$, we therefore define the block diagonal NM×NM matrix $\underline{F}_{N,M}$ as $$\underline{F}_{N,M} \doteq \underline{I}_M \otimes \underline{F}_N \quad (39)$$

such that the matrices $\underline{L}$ and $\underline{H}$ defined as $$\underline{L} \doteq \underline{F}_{N,2} \dot{\underline{l}} \underline{F}_{N,P}^H \quad (40)$$

$$\underline{H} \doteq \underline{F}_{N,2} \dot{\underline{h}} \underline{F}_{N,2}^H \quad (41)$$

consist only of diagonal N×N submatrices. One of the properties of a DFT matrix is $\underline{F}_N^{-1} = \underline{F}_N^H$ such that $\underline{F}_{N,M}^{-1} = \underline{F}_{N,M}^H$. If we now define $$\underline{B} \doteq \underline{F}_{N,P} \underline{b} \quad (42)$$

$$\underline{R} \doteq \underline{F}_{N,2} \underline{r} \quad (43)$$

$$\underline{N} \doteq \underline{F}_{N,2} \tilde{\underline{\eta}} \quad (44)$$

and use these definitions together with (40) and (41) in (36), we finally get the matrix model in the FD $$\underline{R} = \underline{H}\underline{L}\underline{B} + \underline{N} \quad (45)$$

This model describes the received samples of any block-based cyclic-prefixed CPM system in the FD. Three major differences exist between (45) and the FD model presented in [4].

First, we separate the channel matrix H from the one representing the LPs L. This will allow us to treat the channel equalization separately from the CPM demodulation, as will be shown later on. In [4] on the other hand, the LPs are linearly equalized together with the channel. Therefore, their correlation properties cannot be exploited anymore in the Viterbi decoder.

Second, we have used polyphase components to build completely equivalent matrix models in the TD and in the FD. This allowed us to apply the well-known framework of [2] to any block-based cyclic-prefixed CPM system. The equivalent TD and FD models will also enable us to perform all signal processing tasks where they can be done most efficiently, in the TD or in the FD. For instance, we can implement the matched filterbank of our CPM demodulator in the FD, whereas its Viterbi decoder operates in the TD.

Third, as can be seen from (43), we transform the received signal into the FD by two N-point DFT's. This has a computational complexity advantage, as will be explained later on.

Figure 4:
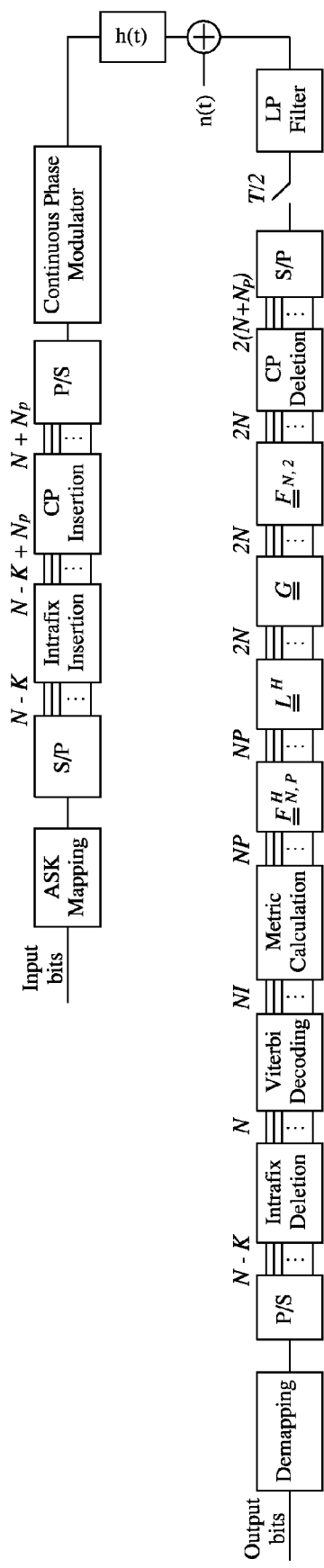
FIG. 4 shows a preferred embodiment of a block diagram of a communication system in which an embodiment of the invention is implemented.

As shown in FIG. 4, the first step of our approach is to equalize the channel H in the FD. Let us define $$\underline{S} \doteq \underline{L}\underline{B} \quad (46)$$

so that (45) can be written as R=HS+N. The MMSE matrix equalizer for this system is given by $$\underline{G}_{MMSE} = \underline{R}_{SS}\underline{H}^H [\underline{H}\underline{R}_{SS}\underline{H}^H + \sigma_n^2 \underline{I}_{2N}]^{-1} \quad (47)$$

where $\sigma_n^2$ is the noise variance and $$\underline{R}_{SS} \doteq \epsilon\{\underline{S}\underline{S}^H\} = \underline{L}\epsilon\{\underline{B}\underline{B}^H\}\underline{L}^H \doteq \underline{L}\underline{R}_{BB}\underline{L}^H \quad (48)$$

with $\epsilon\{\cdot\}$ the expectation operator. As shown in [4], $R_{BB}$ can be calculated and stored once for a given CPM scheme and block size. We assume that the channel H is always known at the receiver. Using the matrix inversion lemma, we can rewrite (47) as $$G_{MMSE} = \left[ R_{SS}^{-1} + \frac{1}{\sigma_n^2} H^H H \right]^{-1} \frac{1}{\sigma_n^2} H^H \quad (49)$$

This equalizer produces an estimate $\hat{S}$ of the sent signal in the FD $$\hat{S} = G_{MMSE} R \quad (50)$$

We emphasize that it only equalizes the channel H but not the LPs L. The CPM demodulator following the equalizer can thus still exploit the memory introduced by the LPs. The demodulator is now described.

After (49), the noise is colored and residual ISI is present but we make the simplifying assumption that both can be modeled as AWGN. The equalizer can then be followed by any demodulator for CPM in AWGN available in the literature.

We construct a demodulator comprising a filterbank matched to the LPs and a Viterbi decoder and implement the filter bank in the FD. Our Viterbi decoder is the same as in [5] and thus operates in the TD.

The demodulator decides that message $\tilde{S}$ is transmitted if and only if it maximizes the metric $$\Lambda = \tilde{S}^H \hat{S} \quad (51)$$

and substituting (42) and (46) into (51) yields $$\Lambda = \tilde{b}^H F_{N,P}^H L^H \hat{S}. \quad (52)$$

We define $$z = [z_0; z_1; \ldots ; z_{P-1}] = F_{N,P}^H L^H \hat{S} \quad (53)$$

such that (52) can be written as $$\Lambda = \tilde{b}^H z \quad (54)$$

The vector z can be interpreted as the output of a bank of P filters matched to the LPs. This bank is represented in the FD by $L^H$ and its outputs are converted back to the TD by $F_{N,P}^H$.

As the length of b is NP, the number of possible hypotheses $\tilde{b}$ grows exponentially with the block size N. To keep the decoding complexity under control, the search for the maximum $\Lambda$ in (54) is therefore implemented in the TD using the Viterbi algorithm as follows. The memory in a CPM signal can be represented by a trellis. A combination of P PCs $\tilde{b}^i = [\tilde{b}_0^i, \tilde{b}_1^i, \ldots, \tilde{b}_{P-1}^i]$ corresponds to every branch $i=1, \ldots, l$ of this trellis [5], where l is the total number of branches of a trellis section. The metric at time n associated with the branch i of the trellis is then calculated as $$\lambda_n^i = \Re \left( \sum_{p=0}^{P-1} z_{p,n} \tilde{b}_p^{i*} \right) \quad (55)$$

for all instants $n=0, \ldots, N-1$ and for all trellis branches $i=1, \ldots, l$ [5] where $\Re(\cdot)$ denotes the real part. The Viterbi algorithm then finds the ML path through the trellis, i.e. the path with the highest total metric. The corresponding ã is chosen as estimate of the sent symbols a in (1).
We first define as in [4]

$$M = HL \quad (56)$$

so that we can write (45) as $R = MB + N$. An MMSE equalizer for this system is given by $$G_{SoA} = R_{BB} M^H [MR_{BB} M^H + \sigma_n^2 I_{2N}]^{-1} \quad (57)$$

The linear MMSE equalizer is applied to our new model (45). It produces an estimate $\hat{B}$ of the PCs in the FD $$\hat{B} @ [\hat{B}0; \hat{B}1; \ldots ; \hat{B}P-1] = G_{SoA} R. \quad (58)$$

We emphasize that equalizer (57) jointly equalizes the channel H and the LPs L, whereas our new equalizers (47) and (61) only equalize the channel but not the LPs. The demodulator after equalizer (47) can thus still exploit the correlation introduced by the LPs L, as it was explained before. Moreover, an MMSE equalizer trades off residual interference versus noise power. Therefore, equalizer (57) pays a price in increased noise power by equalizing the LPs in addition to the channel.

For completeness we briefly review the demodulator of [4]. The estimates of the PCs $\hat{B}$ are transformed back into the TD $$\hat{b}p = N^H \hat{B}p \quad (59)$$

for $p=0, \ldots, P-1$, and fed to a CPM demodulator. It is assumed that the residual ISI after the equalizer can be modeled as AWGN. Therefore, the trellis structure used by the Viterbi decoder is the same as the one described before. The metric at time n associated with the branch i of the trellis on the other hand, corresponding to the combination of Laurent coefficients $\tilde{b}^i$, is now calculated as $$\lambda_n^i = \sum_{p=0}^{P-1} \eta_p |\hat{b}_{p,n} - \tilde{b}_p^i|^2 \quad (60)$$

where $\eta_p$ is the energy in the $p^{th}$ LP $l_p(t)$. We can now see how our receiver exploits the correlation in the LPs by calculating the weights as in (55), whereas the prior art receiver cannot exploit it anymore, as shown by (60).

Our MMSE equalizer (49) can easily be simplified to a ZF equalizer by letting $\sigma_n^2 \to 0$ $$G_{ZF} = [H^H H]^{-1} H^H \quad (61)$$

In contrast to (49), the calculation of this equalizer does not depend on the structure of the CPM autocorrelation matrix. Therefore, we can exploit the knowledge of the structure of H, which consists of four diagonal submatrices, to calculate (6T) efficiently. For this purpose, we define the 2N×2N permutation matrix $$P = \left[ I_N \otimes \begin{bmatrix} 1 \\ 0 \end{bmatrix}, I_N \otimes \begin{bmatrix} 0 \\ 1 \end{bmatrix} \right] \quad (62)$$

so that $P^{-1} = P^H$, which allows us to transform H into a block diagonal matrix $H_P$ as $$H_P = PHP^H \quad (63)$$

Using (63) in (61) yields $$G_{ZF} = P^H [H_P^H H_P]^{-1} H_P^H P \quad (64)$$

Unlike (61), calculating (64) only requires the inversion of a block diagonal matrix with 2×2 submatrices on its diagonal, which is a very low-complexity operation. Therefore, this ZF equalizer is a good alternative for the MMSE equalizer at high signal-to-noise ratios (SNR) or when the higher complexity of the MMSE equalizer calculation is not acceptable.

In one embodiment, the primary aim of equalizing in the FD rather than in the TD is complexity reduction. By transforming the signal into the FD, we can diagonalize the channel matrix H so that it can be inverted at very low complexity. However, in the MMSE equalizer (49) the inverted autocorrelation matrix of the CPM signal $\underline{R}_{SS}^{-1}$ shows up. This matrix is not diagonal as a CPM signal is highly correlated. In this section, we study its structure and prove that we can approximate it by a block diagonal matrix without a noticeable performance loss. This way we regain the low complexity advantage of FDE. We first apply permutation $\underline{P}$, defined in (62), to $\underline{R}_{SS}^{-1}$ to obtain $\underline{R}_{SS,P}^{-1}$ $$\underline{R}_{SS,P}^{-1} = \underline{P}\underline{R}_{SS}^{-1}\underline{P}^H \tag{65}$$

Using (63) and (65) in (49) yields $$\underline{G}_{MMSE} = \underline{P}^H \left[ \underline{R}_{SS,P}^{-1} + \frac{1}{\sigma_n^2} \underline{H}_P^H \underline{H}_P \right]^{-1} \frac{1}{\sigma_n^2} \underline{H}_P^H \underline{P} \tag{66}$$

and for simplicity we define $$\underline{D} \doteq \underline{R}_{SS,P}^{-1} + \frac{1}{\sigma_n^2} \underline{H}_P^H \underline{H}_P \tag{67}$$

Figure 5:
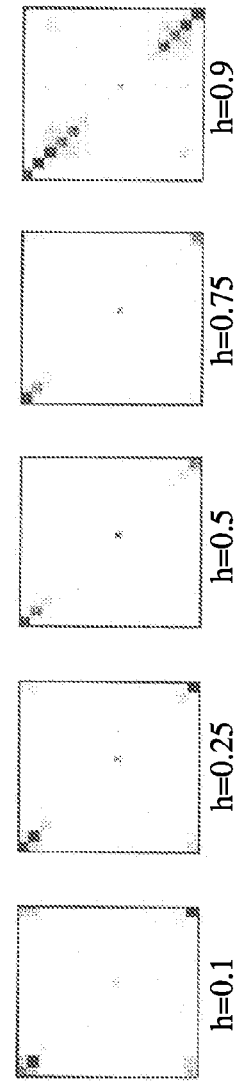
FIG. 5 shows the energy distribution of an inverted CPM autocorrelation matrix.

The complexity of the calculation of the MMSE equalizer will be dominated by the inversion of D. We therefore study its structure here. As stated above, $\underline{H}_P$ is always block diagonal. The second term of D is therefore also always block diagonal. The energy distribution of the first term $\underline{R}_{SS,P}^{-1}$ is shown for different modulation indices in FIG. 5 for a block length N=16. The darker the shade of gray, the more energy is concentrated in that part of the matrix. The value N=16 is too small for practical systems, but it is chosen just for this illustration as it allows us to illustrate that most energy is concentrated along the main block diagonal.

Figure 6:
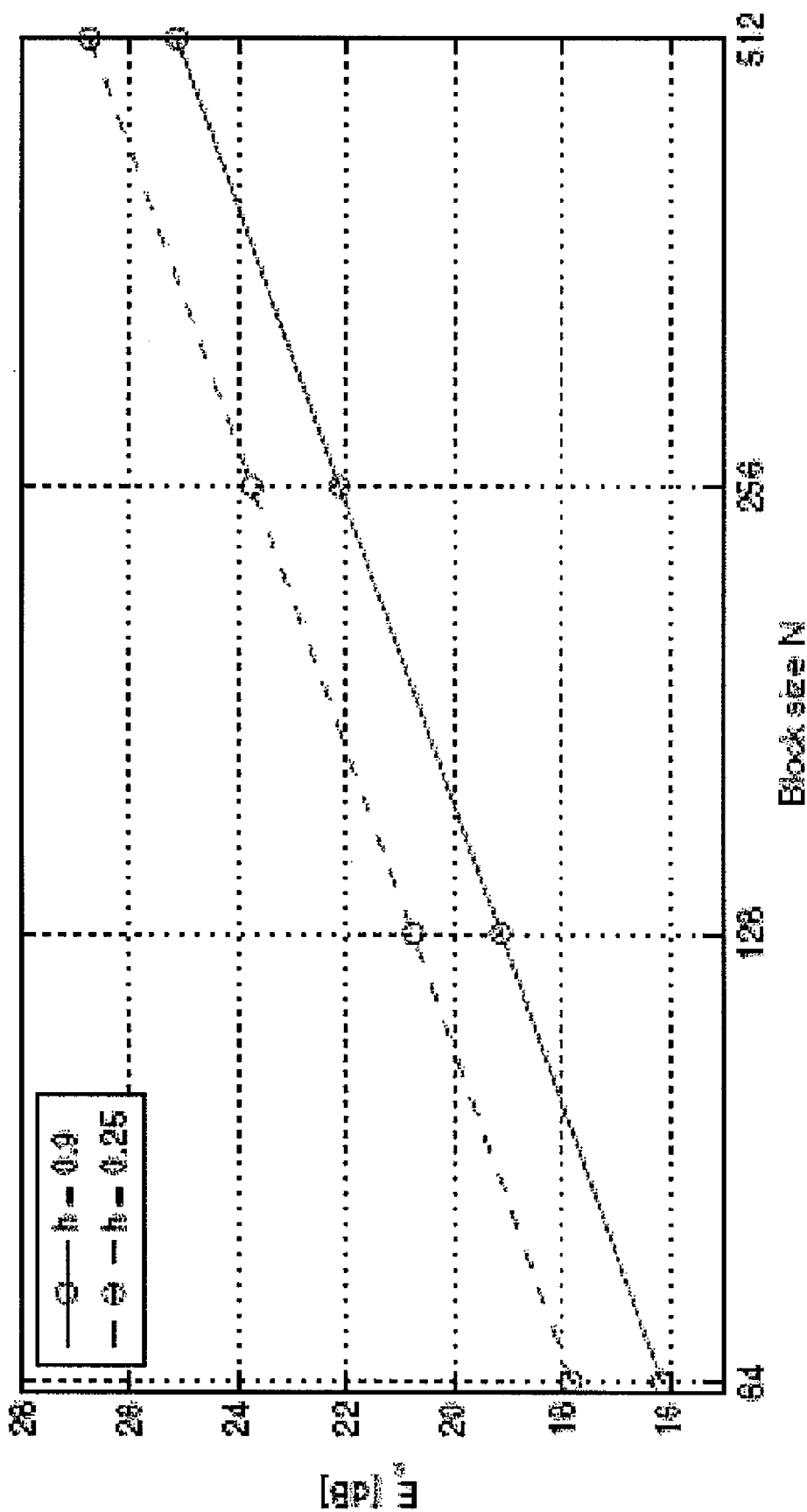
FIG. 6 shows a plot of the proportion of energy in block diagonal elements.

To formalize this observation mathematically for practical values of N, we define $$\underline{C} \doteq \underline{I}_N \otimes \underline{J}_2 \tag{68}$$

where $\underline{J}_2$ is a 2×2 unit matrix. Using $\underline{C}$, we can calculate $$E_\epsilon = \frac{\|\underline{C} \odot \underline{R}_{SS,P}^{-1}\|_F^2}{\|(\underline{J}_{2N} - \underline{C}) \odot \underline{R}_{SS,P}^{-1}\|_F^2} \tag{69}$$

Where $\|\cdot\|_F^2$ represents the Frobenius norm. In words, $E_\epsilon$ is the ratio of the energy in the block-diagonal elements to the energy in the remaining elements of $\underline{R}_{SS,P}^{-1}$. FIG. 6 shows $E_\epsilon$ versus block size N ranging from 64 to 512, for h=0.25 and h=0.9. For h=0.5, $\underline{R}_{SS,P}^{-1}$ is purely block diagonal, so that $E_\epsilon = \infty$. For all cases, high values for $E_\epsilon$ are obtained. We can thus expect that $\underline{R}_{SS,P}^{-1}$ can be very well approximated by $\underline{C} \odot \underline{R}_{SS,P}^{-1}$. Moreover, $\underline{R}_{SS,P}^{-1}$ is only the first term of D, the matrix that is actually to be inverted. Therefore, we propose a low-complexity approximation to $\underline{D}^{-1}$ as $$\underline{D}^{-1} \approx (\underline{C} \odot \underline{D})^{-1} \tag{70}$$

which means that we neglect the elements outside the main block diagonal of D, and then invert this matrix.

For simulations, the binary 3-RC CPM scheme was chosen. Here, 3-RC refers to the raised cosine pulse shape $$f(t) = \left(1 - \cos\frac{2\pi t}{LT}\right) \Big/ 2LT$$

with L=3. Results with modulation index h=0.25, h=0.5 and h=0.9 are presented. A huge bandwidth is available at 60 GHz. Hence, the bit rate $R_b$=1 is chosen. For this system, the channel is severely frequency-selective. Therefore, a block-size N=256 and CP length $N_P$=64 are chosen. The receiver lowpass (LP) filter is modeled as a raised cosine filter with roll-off factor R=0.5. The multipath channel h(t) is simulated using the Saleh-Valenzuela (SV) channel model [6] and the simulated 60 GHz indoor environment is described in [7]. The base station has an omni-directional antenna with 120° beam width and is located in the center of the room. The terminal has an omni-directional antenna with 60° beam width and is placed at the edge of the room. The corresponding SV parameters are 1/Λ=75, Γ=20, 1/λ=5 and γ=9.

Figure 7:
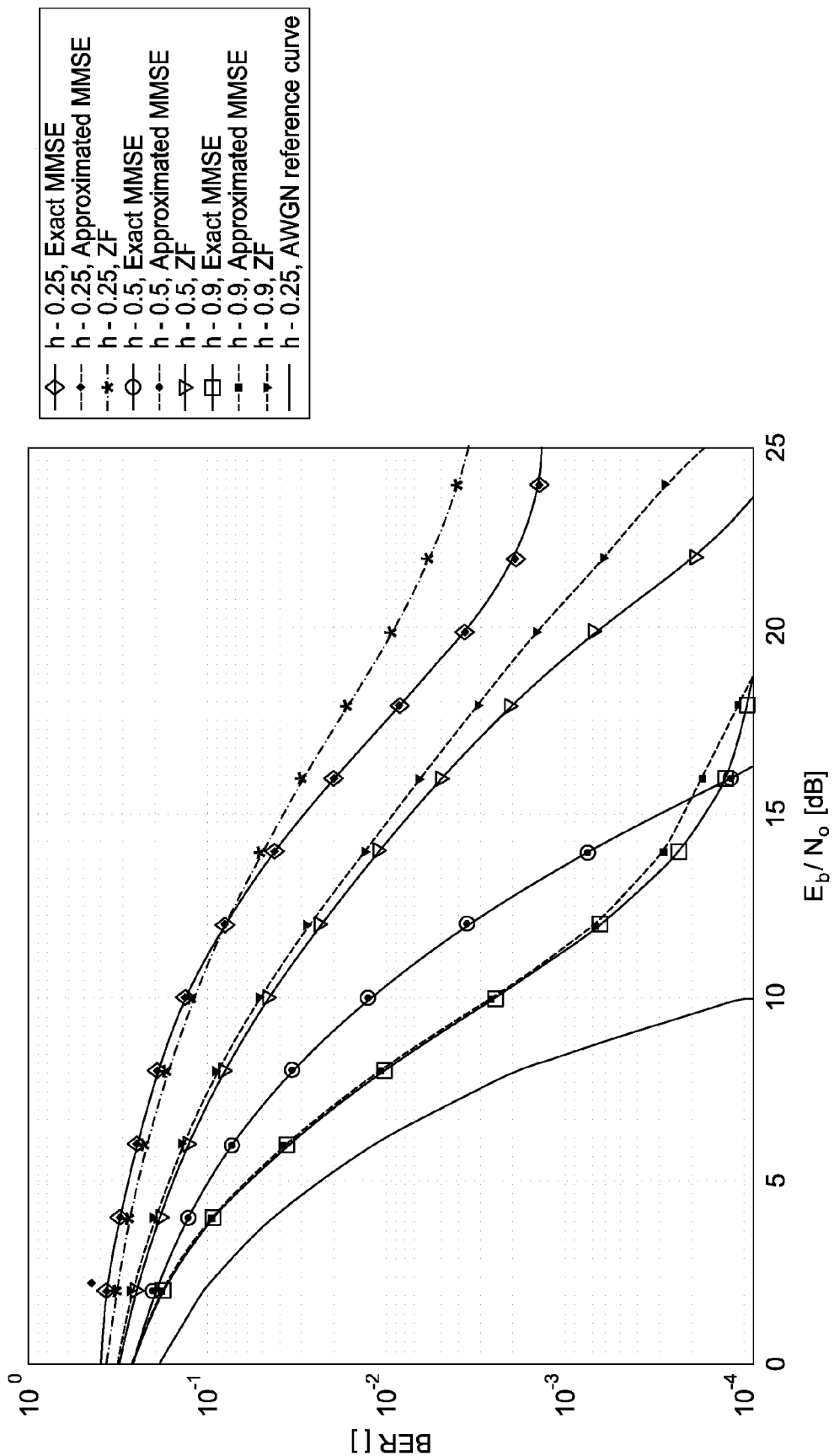
FIG. 7 plots the BER as a function of $E_b/N_0$ for some illustrative examples, wherein $E_b$ is the energy per bit and $N_0$ is the noise one-sided power spectral density (PSD).

FIG. 7 shows the bit error rate (BER) of our ZF (64), MMSE (49) and approximated MMSE (70) equalizers in the 60 GHz environment. To verify the simulation framework, a reference curve in AWGN is also provided. The BER is presented in function of $E_b/N_0$ where $E_b$ is the energy per bit and $N_0$ is the noise one-sided power spectral density (PSD). First, we observe that increasing h lowers the BER. This is because the higher h, the higher the minimum Euclidean distance of the CPM scheme. Second, the MMSE equalizer always performs better than the ZF. The gap between ZF and MMSE performance becomes larger as h grows. This is because a larger h means that more correlation is introduced in the CPM signal. This correlation can be better exploited by the MMSE equalizer since it takes into account $\underline{R}_{SS,P}^{-1}$ as it can be seen from (66). Third, there is no noticeable difference between the exact MMSE and the approximation: the curves almost perfectly coincide.

Moreover, we notice two flooring phenomena. First, for h=0.25, the curves start to floor at high $E_b/N_0$ due to bad channels containing spectral zeros in the chosen set. This was verified by removing the 10% worst channels, which made the flooring disappear (not shown here). Second, the BER curve of the h=0.9 MMSE receiver also starts to floor. This is because part of the PSD of the h=0.9 CPM scheme falls beyond the passband of the LP filter. Therefore, part of the information is lost. To mitigate this problem, a higher sampling rate can be used in the receiver.

Figure 8:
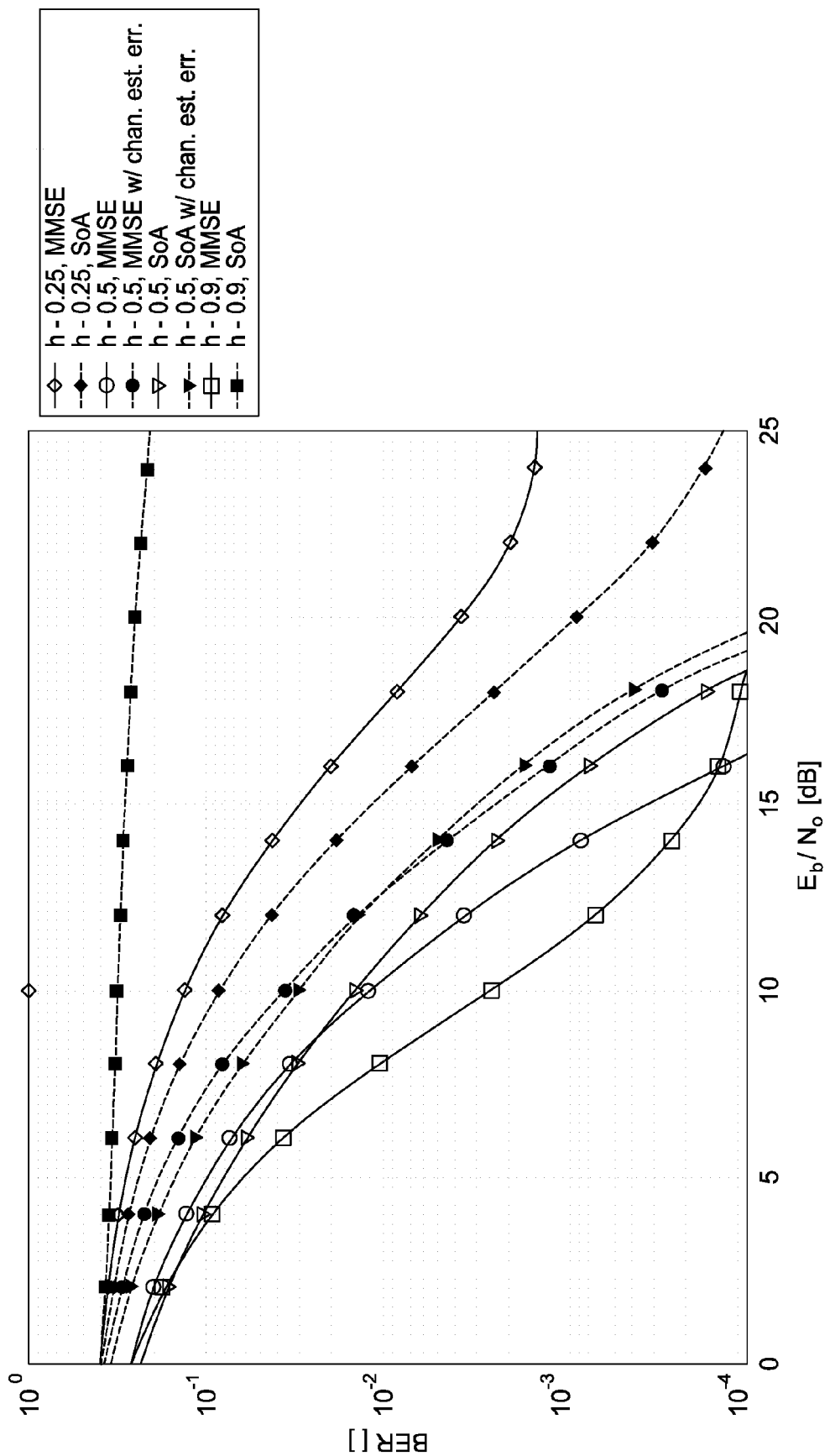
FIG. 8 plots the BER as a function of $E_b/N_0$ for some illustrative examples, wherein $E_b$ is the energy per bit and $N_0$ is the noise one-sided power spectral density (PSD).

In FIG. 8, we compare the BER performance of our new MMSE equalizer (49) to the prior art receiver. For h=0.25, the prior art receiver outperforms the MMSE receiver. For h=0.5, the MMSE receiver outperforms the prior art receiver for high $E_b/N_0$ values. For h=0.9, the prior art receiver cannot recover the information reliably anymore whereas the MMSE receiver keeps on performing very well. These observations can be explained by the correlation properties of the PCs. Studying (6), we note that the larger h, the more correlation is introduced in the PCs. Comparing (55) and (60), our new MMSE receiver exploits this correlation in the Viterbi decoder by calculating the weights as in (55), whereas the correlation is partly lost and can therefore not be used anymore in the prior art receiver, which calculates the weights as in (60). For h=0.25, the correlation is small and therefore so is the loss. The approximation made in our MMSE receiver that models the residual ISI and colored noise at the input of the CPM demodulator as AWGN is then more deteriorating.

Therefore, the prior art receiver outperforms the MMSE receiver. For h=0.5, the correlation exploitation starts to pay off, and the MMSE receiver starts to outperform the prior art receiver. For h=0.9, the correlation becomes so important that it cannot be neglected by the receiver anymore. The prior art receiver therefore can no longer recover the information properly, whereas our new MMSE receiver still performs very well.

For h=0.5 finally, results with channel estimation errors made in the receiver are also provided. The channel estimate used by the receiver is ĥ=h+$h_e$. Here, h is the perfect channel and $h_e$ is a white Gaussian error term with zero mean. Its variance satisfies $\sigma_h^2/\sigma_{h_e}^2 = E_b/N_0$. Our MMSE receiver suffers from a constant degradation of about 3 dB. It is more sensitive to channel estimation errors than the prior art receiver. For this latter, the gap between the perfect and channel estimate curves becomes smaller when $E_b/N_0$ grows. This can be explained as follows. In the low $E_b/N_0$ region, the prior art receiver suffers relatively more from channel estimation errors than from the lack of correlation exploitation in the Viterbi decoder. However, when the $E_b/N_0$ grows, this correlation exploitation becomes more important as the performance gets limited by ISI rather than by noise. The channel estimation error effect on the other hand, stays constant. Therefore, the gap narrows. For h=0.25 and h=0.9, the same results were obtained (not shown).

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

REFERENCES

REFERENCES, which are hereby incorporated in its entirety.

[1] P.A. Laurent, "Exact and approximate construction of digital phase modulations by superposition of amplitude modulated pulses (AMP)," *IEEE Trans. Commun.*, vol. 34, no. 2, pp. 150-160, February 1986.

[2] K. Murota and K. Hirade, "GMSK modulation for digital mobile radio telephony," *IEEE Trans. Commun.*, vol. 29, no. 7, pp. 1044-1050, July 1981.

[3] Z. Wang and G. B. Giannakis, "Wireless multicarrier communications," *IEEE Signal Process. Mag.*, vol. 17, no. 3, pp. 29-48, May 2000.

[4] F. Pancaldi and G. M. Vitetta, "Equalization algorithms in the frequency domain for continuous phase modulations," *IEEE Trans. Commun.*, vol. 54, no. 4, pp. 648.658, April 2006.

[5] G. K. Kaleh, "Simple coherent receivers for partial response continuous phase modulation," IEEE J. Sel. Areas Comm., vol. 7, no. 9, pp. 1427-1436, December 1989.

[6] A. Saleh and R. Valenzuela, "A statistical model for indoor multipath propagation," *IEEE J. Sel. Areas Commun.*, vol. 5, no. 2, pp. 128-137, February 1987.

[7] J. H. Park, Y. Kim, Y. S. Hur, K. Lim and K. H. Kim, "Analysis of 60 GHz band indoor wireless channels with channel configurations," in *Proc. IEEE PIMRC*, September 1998, pp. 617-620.

What is claimed is:

1. A method of performing frequency domain equalization of a cyclic continuous phase modulated (CPM) signal received via a channel, comprising:
   representing the received cyclic CPM signal as a matrix model comprising a channel matrix representing influence of the channel, the channel matrix being separate from a Laurent pulse matrix and a pseudocoefficient matrix, the Laurent pulse matrix representing Laurent pulses, the pseudocoefficient matrix representing pseudocoefficients determined by Laurent decomposition of the received cyclic CPM signal;
   applying a channel equalizer on the separate channel matrix; and
   after applying the channel equalizer, demodulating the received cyclic CPM signal by the matrix model, the demodulation exploiting known correlation properties of the Laurent pulses and the pseudocoefficients.

2. The method according to claim 1, wherein the channel equalizer is a zero-forcing equalizer.

3. The method according to claim 1, wherein the channel equalizer is an minimum mean square error (MMSE) equalizer comprising an autocorrelation matrix of the CPM signal to be inverted, the method further comprising approximating the autocorrelation matrix by a corresponding block diagonal matrix.

4. The method according to claim 3, wherein the corresponding block diagonal matrix is formed by neglecting elements of the autocorrelation matrix beyond a main block diagonal of predetermined block size N.

5. The method according to claim 1, wherein the matrix model is a polyphase matrix model comprising equivalent time domain and frequency domain matrix models.

6. The method according to claim 5, wherein the demodulation comprises applying a matched filterbank matched to the Laurent pulses in the frequency domain and a Viterbi decoder in the time domain.

7. The method according to claim 6, wherein the Viterbi decoder performs maximum likelihood sequence detection to detect sent symbols in the received cyclic CPM signal.

8. The method according to claim 1, wherein the matrix model comprises $$\underline{R} = \underline{H}\underline{L}\underline{B} + \underline{N}$$

in which R is a frequency domain matrix representing a received cyclic CPM signal to be demodulated, H is the channel matrix, L is the Laurent pulse matrix, $\overline{B}$ is the pseudocoefficients matrix and N is a noise matrix representing noise.

9. The method according to claim 1, wherein the CPM signal comprises state compensation data for coping with memory of the CPM signal.

10. A device for performing frequency domain equalization of a cyclic continuous phase modulated (CPM) signal received via a channel, the device comprising:
   means for representing the received cyclic CPM signal as a matrix model comprising a channel matrix representing influence of the channel, the channel matrix being separate from a Laurent pulse matrix and a pseudocoefficient matrix, the Laurent pulse matrix representing Laurent pulses, the pseudocoefficient matrix representing pseudocoefficients determined by Laurent decomposition of the received cyclic CPM signal;

means for applying a channel equalizer on the separate channel matrix; and means for, after applying the channel equalizer, demodulating the received cyclic CPM signal by the matrix model, the demodulation exploiting known correlation properties of the Laurent pulses and the pseudocoefficients.

11. A device for performing frequency domain equalization of a cyclic continuous phase modulated (CPM) signal received via a channel, the device comprising:

a representing module configured to represent the received cyclic CPM signal as a matrix model comprising a channel matrix representing influence of the channel, the channel matrix being separate from a Laurent pulse matrix and a pseudocoefficient matrix, the Laurent pulse matrix representing Laurent pulses, the pseudocoefficient matrix representing pseudocoefficients determined by Laurent decomposition of the received cyclic CPM signal;

a channel equalizer configured to perform channel equalization on the separate channel matrix; and a demodulator configured to demodulate the received cyclic CPM signal by the matrix model, the demodulation exploiting known correlation properties of the Laurent pulses and the pseudocoefficients.

12. The device according to claim 11, wherein the demodulator comprises a matched filterbank matched to the Laurent pulses in the frequency domain and a Viterbi decoder in the time domain.

13. The device according to claim 12, wherein the Viterbi decoder performs maximum likelihood sequence detection to detect sent symbols in the received cyclic CPM signal.

14. The device according to claim 11, wherein the channel equalizer is a zero-forcing equalizer.

15. The device according to claim 11, wherein the channel equalizer is an minimum mean square error (MMSE) equalizer comprising an autocorrelation matrix of the CPM signal to be inverted, the device further comprising an approximating module configured to approximate the autocorrelation matrix by a corresponding block diagonal matrix.

16. The device according to claim 15, wherein the corresponding block diagonal matrix is formed by neglecting elements of the autocorrelation matrix beyond a main block diagonal of predetermined block size N.

17. The device according to claim 11, wherein the matrix model is a polyphase matrix model comprising equivalent time domain and frequency domain matrix models.

18. The device according to claim 11, wherein the matrix model comprises $$\underline{R}=\underline{HLB}+\underline{N}$$

in which $\underline{R}$ is a frequency domain matrix representing a received cyclic CPM signal to be demodulated, $H$ is the channel matrix, $\underline{L}$ is the Laurent pulse matrix, $\underline{B}$ is the pseudocoefficients matrix and $\underline{N}$ is a noise matrix representing noise.

19. The device according to claim 11, wherein the CPM signal comprises state compensation data for coping with memory of the CPM signal.

* * * * *